(12) United States Patent
Zhan et al.

(10) Patent No.: US 10,311,830 B2
(45) Date of Patent: Jun. 4, 2019

(54) OPERATING METHOD, RELATED TOUCH DISPLAY DEVICE AND RELATED SEMICONDUCTOR DEVICE

(71) Applicants: BOE TECHNOLOGY GROUP CO., LTD, Beijing (CN); HEFEI XINSHENG OPTOELECTRONICS TECHNOLOGY CO., LTD., Hefei (CN)

(72) Inventors: Yifei Zhan, Beijing (CN); Dayu Zhang, Beijing (CN)

(73) Assignees: BOE TECHNOLOGY GROUP CO., LTD., Beijing (CN); Hefei Xinsheng Optoelectronics Technology Co., Ltd., Hefei, Anhui (CN)

( * ) Notice: Subject to any disclaimer, the term of this patent is extended or adjusted under 35 U.S.C. 154(b) by 0 days.

(21) Appl. No.: 15/501,060

(22) PCT Filed: Aug. 12, 2016

(86) PCT No.: PCT/CN2016/094811
§ 371 (c)(1),
(2) Date: Feb. 1, 2017

(87) PCT Pub. No.: WO2017/113808
PCT Pub. Date: Jul. 6, 2017

(65) Prior Publication Data
US 2018/0040296 A1    Feb. 8, 2018

(30) Foreign Application Priority Data

Dec. 31, 2015    (CN) .......................... 2015 1 1032686

(51) Int. Cl.
*G09G 5/10*    (2006.01)
*G06F 3/0488*    (2013.01)
(Continued)

(52) U.S. Cl.
CPC ............. *G09G 5/10* (2013.01); *G06F 3/0416* (2013.01); *G06F 3/0488* (2013.01);
(Continued)

(58) Field of Classification Search
CPC ................................. G09G 5/01; G06F 3/0416
See application file for complete search history.

(56) References Cited

U.S. PATENT DOCUMENTS

2010/0165147 A1* 7/2010 Tabata ..................... H04N 5/57
348/231.99
2010/0295877 A1* 11/2010 Yun ...................... G09G 3/3406
345/690
(Continued)

FOREIGN PATENT DOCUMENTS

CN    103399661 A    11/2013
CN    203909670 U    10/2014
(Continued)

OTHER PUBLICATIONS

State Intellectual Property Office of the P.R.C (SIPO) Office Action 1 for 201511032686.3 dated Dec. 20, 2017 16 Pages (including translation).
(Continued)

*Primary Examiner* — Nitin Patel
*Assistant Examiner* — Robert M Stone
(74) *Attorney, Agent, or Firm* — Westerman, Hattori, Daniels & Adrian, LLP

(57) ABSTRACT

The present disclosure provides an operating method for adjusting a brightness level of a touch display device with a touch display panel, including: detecting a touch motion performed on the touch display panel; adjusting the touch display panel to display images with a first brightness level; detecting a distance between a user and the touch display panel; and adjusting the brightness level of the touch display
(Continued)

panel to display images based on the distance between the user and the touch display panel.

16 Claims, 4 Drawing Sheets

(51) Int. Cl.
    *G06F 3/041*     (2006.01)
    *G06F 3/0484*     (2013.01)

(52) U.S. Cl.
    CPC . *G06F 3/04847* (2013.01); *G09G 2320/0626* (2013.01); *G09G 2354/00* (2013.01)

(56) References Cited

U.S. PATENT DOCUMENTS

| | | | | |
|---|---|---|---|---|
| 2012/0013552 A1* | 1/2012 | Ahn | ................... | G06F 3/04847 345/173 |
| 2012/0169236 A1* | 7/2012 | Kim | ................... | H05B 33/0872 315/127 |
| 2013/0063340 A1* | 3/2013 | Mondragon | ............. | G09G 5/00 345/156 |
| 2013/0328842 A1* | 12/2013 | Barnhoefer | .......... | G09G 3/3406 345/207 |
| 2014/0028545 A1* | 1/2014 | Tsai | ....................... | G06F 3/005 345/156 |
| 2014/0139560 A1* | 5/2014 | Jung | ........................ | G09G 5/10 345/690 |
| 2014/0340334 A1* | 11/2014 | Cho | ........................ | G06F 3/013 345/173 |
| 2015/0138122 A1* | 5/2015 | Cho | ..................... | G09G 3/3406 345/173 |
| 2015/0301670 A1* | 10/2015 | Chiu | ................... | G09G 3/2003 345/589 |
| 2017/0045936 A1* | 2/2017 | Kakapuri | ................ | G06F 3/011 |

FOREIGN PATENT DOCUMENTS

| | | | | |
|---|---|---|---|---|
| CN | 104656887 A | 5/2015 | | |
| CN | 105023552 A | 11/2015 | | |
| CN | 105677089 A | 6/2016 | | |
| JP | 2014167801 A | * | 9/2014 | .......... G06F 3/0488 |
| WO | WO-2014024366 A1 | * | 2/2014 | .......... G06F 3/0488 |
| WO | WO-2015156762 A1 | * | 10/2015 | .............. G06F 3/011 |

OTHER PUBLICATIONS

The World Intellectual Property Organization (WIPO) International Search Report for PCT/CN2016/094811 dated Oct. 24, 2016 p. 1-12.

Office Action dated Aug. 9, 2018, issued in counterpart Chinese Application No. 201511032686.3, with English translation (14 pages).

Office Action dated Jan. 31, 2019, issued in counterpart CN Application No. 201511032686.3, with English translation (49 pages).

* cited by examiner

OPERATING METHOD, RELATED TOUCH DISPLAY DEVICE AND RELATED SEMICONDUCTOR DEVICE

CROSS-REFERENCES TO RELATED APPLICATIONS

This PCT patent application is a national phase entry under 35 U.S.C. § 371 of International Application No. PCT/CN2016/094811, filed on Aug. 12, 2016, which claims priority of Chinese Patent Application No. 201511032686.3 filed on Dec. 31, 2015 The above enumerated patent applications are incorporated by reference herein in their entirety.

TECHNICAL FIELD

The present invention generally relates to the display technologies and, more particularly, relates to an operating method, a related touch display device, and a related semiconductor device.

BACKGROUND

As a new input device, compared to conventional display panels, touch display panels have advantages such as being easier to use, having shorter response time, and being space-saving. Touch display panels are currently regarded as the simplest, the most convenient, and the most natural human-computer interaction means. The application of touch display panels are not limited to small portable electronic device. Instead, touch display panels are incorporated in more and more large-sized display devices.

When a large-sized display device is displaying images to a user from afar, it is often required that the display panel of the large-sized display device has a certain level of brightness. When the user is operating the display panel from a short distance, the undesirably high brightness of the large-sized display panel can be harmful to the user's vision. Conventional display panels are usually not able to automatically adjust its brightness level in accordance with the user's distance to the display panel. As a result, it can be tedious and time-consuming to change the brightness levels of a display panel using a remote control device or device buttons.

BRIEF SUMMARY

The present disclosure provides an operating method for adjusting a brightness level of a touch display device with a touch display panel. The operating method including: detecting a touch motion performed on the touch display panel; adjusting the touch display panel to display images with a first brightness level; detecting a distance between a user and the touch display panel; and adjusting the brightness level of the touch display panel to display images based on the distance between the user and the touch display panel.

Optionally, the operating method further includes: displaying images with the first brightness level if the distance between the user and the touch display panel is less than a preset distance.

Optionally, the operating method further includes: displaying images with a second brightness level if the distance between the user and the touch display panel is greater than or equal to the preset distance.

Optionally, the detecting the touch motion performed on the touch display panel includes detecting a change of a pressure applied on the touch display panel.

Optionally, the detecting the touch motion performed on the touch display panel includes detecting a change of touch-sensing signals transmitted by the touch display panel.

Optionally, the operating method further includes: storing a value of the first brightness level before detecting the touch motion performed on the touch display panel such that the touch display panel displays images with the first brightness level when multiple touch motions are performed on the touch display panel.

Optionally, the operating method further includes storing a value of the second brightness level, the second brightness level being a brightness level displayed by the touch display panel before the touch motion or after the brightness level is adjusted by the user.

Optionally, detecting the distance between the user and the touch display panel includes periodically obtaining the user's images for comparing the user's images with a preset image to determine the distance between the user and the touch display panel.

Optionally, detecting the distance between the user and the touch display panel includes measuring the distance between the user and the touch display panel by acoustic waves or infrared waves.

Optionally, the first brightness level is lower than a brightness level displayed by the touch display panel before the touch motion on the touch display panel.

Another aspect of the present disclosure provides a touch display device with a touch display panel, including a touch motion detecting module for detecting a touch motion performed on the touch display panel; a distance detecting module for detecting a distance between a user and the touch display panel; and a processing module, coupled to the touch motion detecting module and the distance detecting module. The processing module is configured to adjust the touch display panel to display images with a first brightness level based on signals from the touch motion detecting module, and adjust a brightness level of the touch display panel to display images based on the distance detected by the distance detecting module.

Optionally, the processing module is configured to adjust the touch display panel to display images with the first brightness level if the distance between the user and the touch display panel is less than a preset distance.

Optionally, the processing module is configured to adjust the touch display panel to display images with a second brightness level if the distance between the user and the touch display panel is greater than or equal to the preset distance.

Optionally, the touch motion detecting module is configured to detect a touch motion by detecting a change of pressure applied on the touch display panel.

Optionally, the touch motion detecting module is configured to detect a touch motion by detecting a change of touch-sensing signals transmitted by the touch display panel.

Optionally, the touch motion detecting module comprises a pressure sensor.

Optionally, the touch motion detecting module comprises a touch sensor.

Optionally, the touch sensor comprises at least one of a capacitive touch-sensing component, a resistive touch-sensing component, and an optical touch-sensing component.

Optionally, the distance detecting module is configured to detect the distance by periodically obtaining user's images for comparing the user's images with a preset image to determine the distance between the user and the touch display panel.

Optionally, the distance detecting module is configured to detect the distance by measuring the distance between the user and the touch display panel by acoustic waves or infrared waves.

Optionally, the distance detecting module comprises a camera.

Optionally, the distance detecting module comprises at least one of an infrared sensor and an acoustic sensor.

Optionally, the touch display device further includes a storage module coupled to the processing module, wherein the storage module is configured to store the first brightness level and the second brightness level of the touch display panel before the touch motion.

Another aspect of the present disclosure provides a semiconductor device, including one or more of the disclosed touch display devices.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

Figure 1:
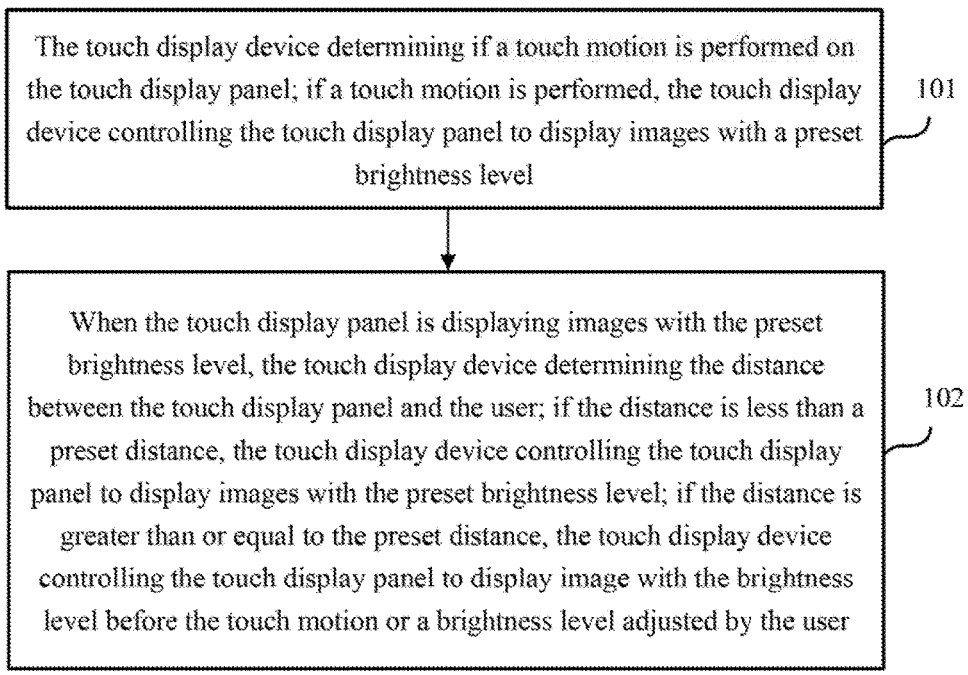
FIG. 1 illustrates an exemplary operating method to adjust the brightness level of a touch display device according to various disclosed embodiments of the present disclosure.
Figure 2:
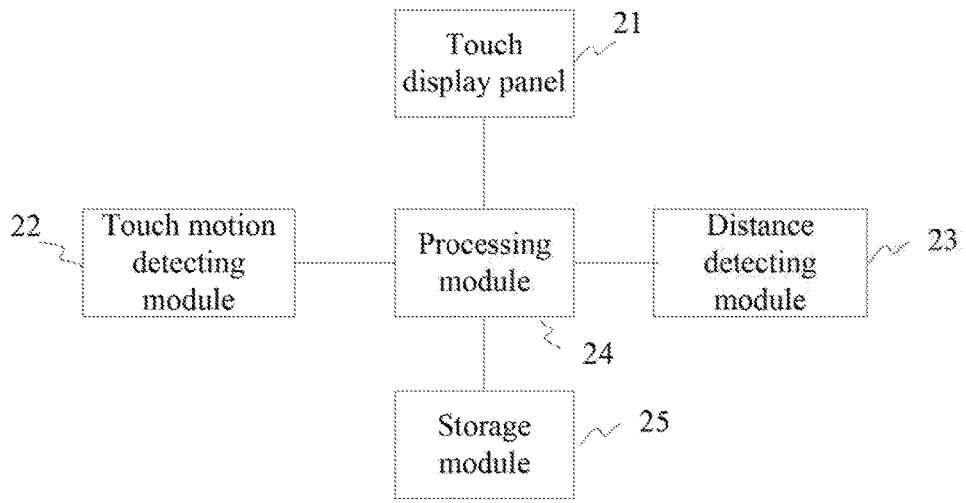
FIG. 2 illustrates an exemplary structure of a touch display device according to various disclosed embodiments of the present disclosure.
Figure 3:
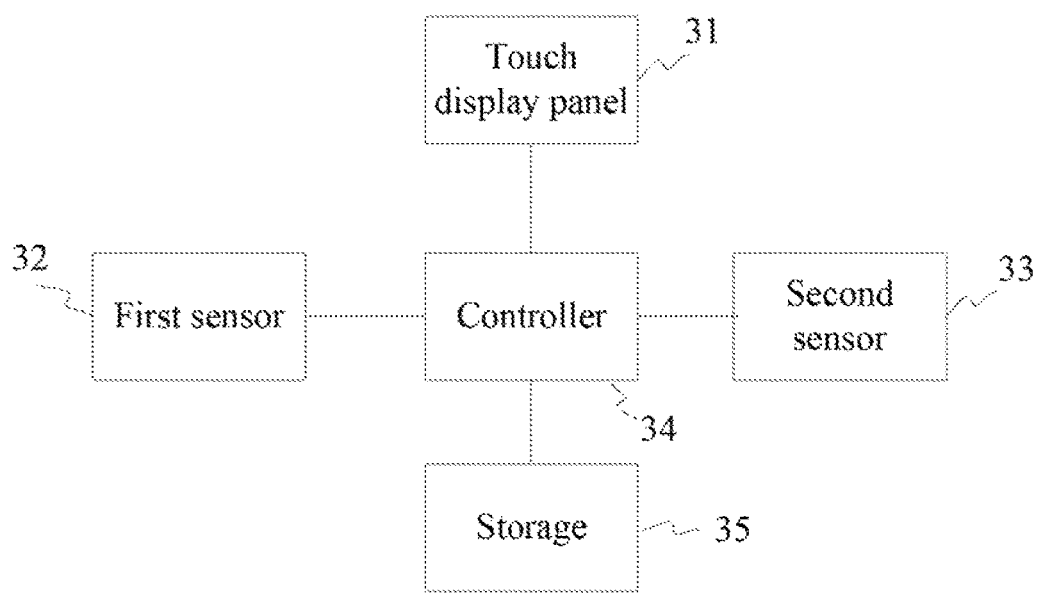
FIG. 3 illustrates an exemplary block diagram of a touch display device according to various disclosed embodiments of the present disclosure.
Figure 4:
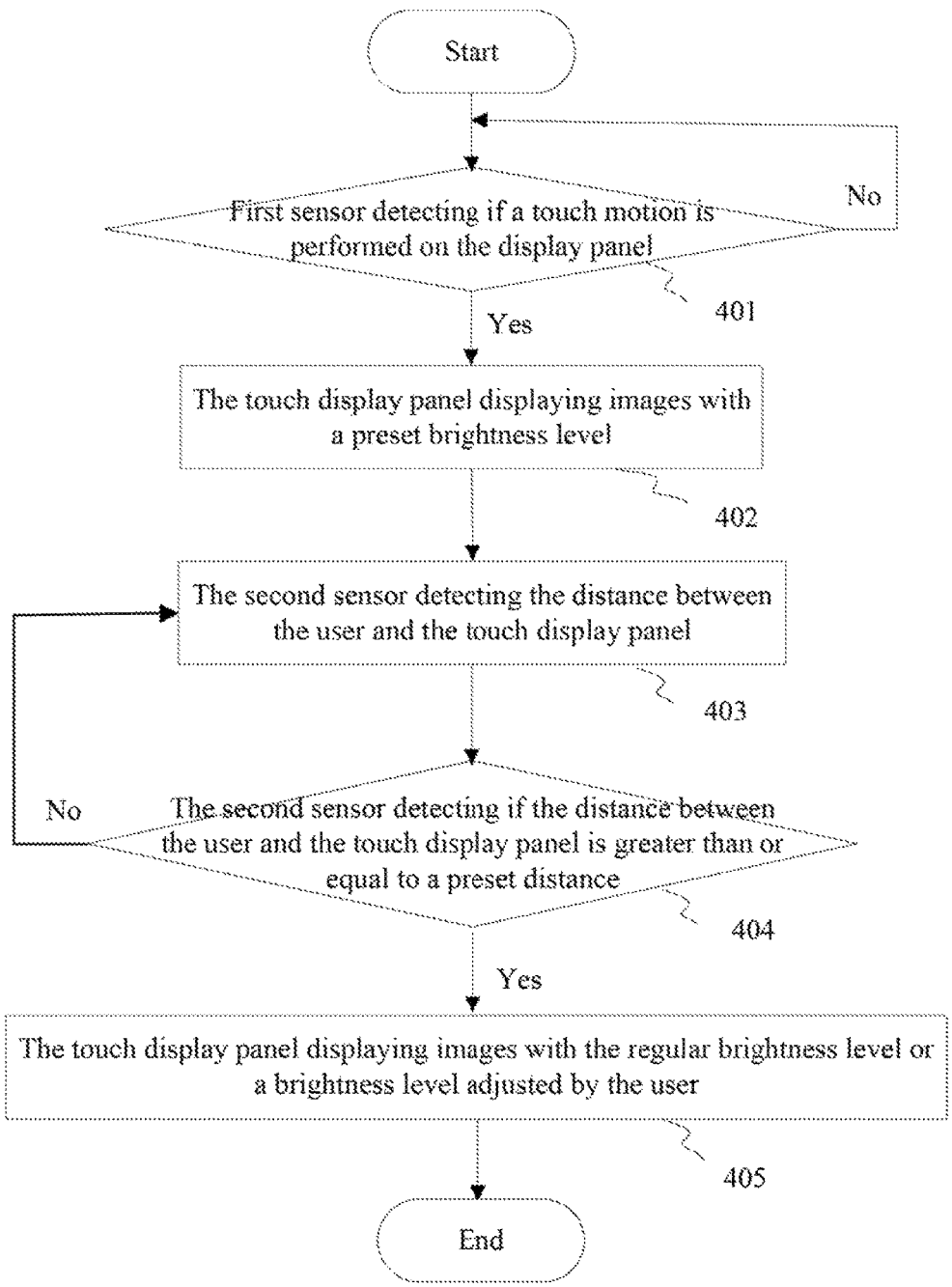
FIG. 4 illustrates a process flow of an exemplary computer program to adjust the brightness level of a touch display device according to various disclosed embodiments of the present disclosure.
Figure 5:
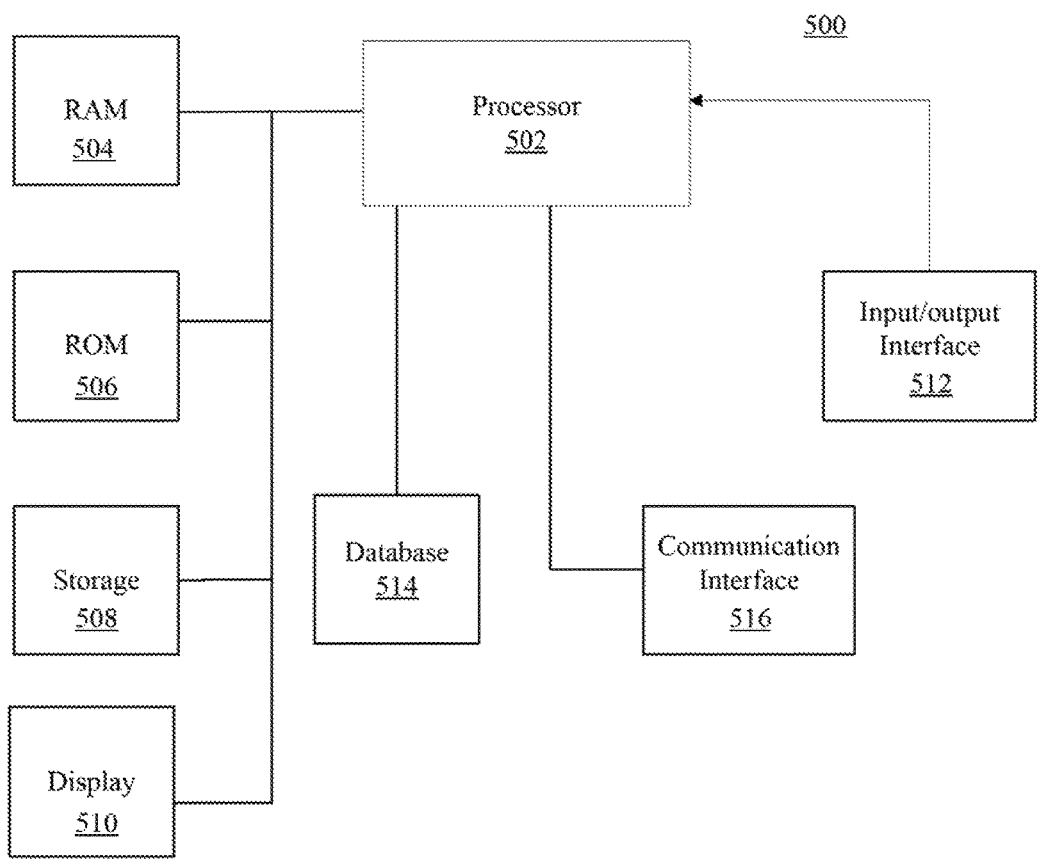
FIG. 5 illustrates an exemplary block diagram of the processing module or controller used in the touch display device illustrate in FIG. 3.

FIG. 1 illustrates an exemplary operating method to adjust the brightness level of a touch display device. FIG. 2 illustrates an exemplary structure of a touch display device. FIG. 3 illustrates an exemplary block diagram of a touch display device. FIG. 4 illustrates a process flow of an exemplary computer program for executing the operating method in adjusting the brightness level of a touch display device. FIG. 5 illustrates an exemplary block diagram of the processing module/controller used in the present disclosure.

Embodiments of the present disclosure provide a touch display panel that can adjust its brightness level according to the user positions and operations. In some embodiments, by detecting the user's operation on the touch display panel and detecting the distance between the user and the touch display panel, the touch display device may automatically reduce or increase the brightness level of the touch display panel.

For example, when the user is operating the touch display panel from a short distance, the user may watch the displayed images with a desired lower brightness level. Thus, the automatic brightness level adjustment may reduce the high brightness level of the touch display panel from harming the user's vision. In addition, the touch display panel may determine that the user is not in the close vicinity of the touch display panel, the touch display device may control the touch display panel to display images with the "regular" brightness level before the touch motion or a brightness level adjusted by the user. Thus, the user may watch the display images with a safe and comfortable brightness level.

One aspect of the present disclosure provides an operating method to adjust the brightness level in a touch display device. The touch display device may include a touch display panel. Touch motions may be performed on the touch display panel.

As shown in FIG. 1, the operating method may include steps S101 and S102.

In step S101, the touch display device may determine if a touch motion is performed on the touch display panel. If the touch display device detects a touch motion is performed on the touch display panel, the touch display device may control the touch display panel to display images with a preset brightness level. The preset brightness level may also be referred as the first brightness level.

Multiple ways may be used to determine if a touch motion is performed. For example, the touch display device may determine if a touch motion is performed on the touch display panel by detecting the pressure change, e.g., an increase of pressure, on the touch display panel. Also, the touch display device may also determine if a touch motion is performed on the touch display panel by detecting changes of the touch-sensing signals transmitted by the touch display panel. Other suitable ways may also be used to determine if a touch motion is performed on the touch display panel. The specific ways to implement this function should be determined according to different applications and designs and should not be limited by the embodiments of the present disclosure. One or more of the ways described above may be implemented in the touch display panel to detect if a touch motion is performed on the touch display panel.

In some embodiments, to prevent the touch display panel from changing the brightness level multiple times when the touch display panel is touched more than once, the operating method may also include setting and saving the value of the preset brightness level before the touch display device detects the touch motion. Accordingly, the touch display panel may display images with the preset brightness level each time the touch display device detects a touch motion.

Further, in some embodiments, when the user leaves the touch display panel and is sufficiently far away from the touch display panel, to display images for the user with a desired brightness level before the touch motion, the operating method may also include controlling the touch display device to save the previous brightness level of the touch display panel before displaying images with the preset brightness level. The previous brightness level or second brightness level refers to the luminance values corresponding to the brightness level before the touch motion. In some embodiments, the brightness level before the touch motion may be referred to as a regular brightness level. By saving the previous brightness level of the touch display panel, the touch display panel may display images with the previous brightness level, i.e., the brightness level before the touch motion, after the user has moved out of the close vicinity.

In step S102, when the touch display panel is displaying images with the preset brightness level, the touch display device may determine the distance between the touch display panel and the user. If the distance is less than a preset distance, the touch display device may control the touch display panel to display images with the preset brightness level for close range viewing. If the distance is greater than or equal to the preset distance, the touch display device may control the touch display panel to display image with the brightness level before the touch motion or a brightness level is adjusted by the user. The brightness level before the touch motion or after being adjusted by the user may be referred as the second brightness level.

Many methods may be implemented to detect the distance between the touch display panel and the user. For example, the touch display device may periodically obtain the user's images, and determine the distance between the user and the touch display panel by comparing the user's images to a preset image. The user's images may be taken by a suitable imaging means, such as a camera. Also, the touch display device may also apply ranging methods such as infrared ranging and sound ranging to determine the distance between the user and the touch display panel. The specific ways to implement this function should be determined according to different applications and designs and should not be limited by the embodiments of the present disclosure. One or more of the ways described above may be implemented in the touch display panel to detect the distance between the user and the touch display panel.

Further, to determine if the user has left the vicinity of the touch display panel and the distance between the user and the touch display panel is within a harmless range to the user's vision, in some embodiments, the touch display device may be configured to set and save a preset distance. The touch display device may compare the detected distance between the user and the touch display panel to the preset distance and determine the brightness level the touch display panel displays. The preset distance may be set by the user or may be set by the manufacturer.

Specifically, when the detected distance between the user and the touch display panel is less than the preset distance, the touch display device may control the touch display panel to display images with the preset brightness level. When the detected distance between the user and the touch display panel is greater than or equal to the preset distance, the touch display device may control the touch display panel to display images with the brightness level before the touch motion or a brightness level adjusted by the user.

When the user is operating the touch display panel from a short distance, the touch display device may perform operations with adjusting the brightness level or without adjusting the brightness level. If the user performs operations without brightness level adjustments, such as changing channels, adjusting volume, and typing, when the user is operating the touch display panel, the touch display device may determine the user has left the touch display panel and is sufficiently far away from the touch display panel. The touch display device may control the touch display panel to display images with the brightness before the touch motion, e.g., the regular brightness level, so that the user may watch the displayed images from far away. If the user performs operations while adjusting the brightness levels, for example, the user may adjust the brightness level of the touch display panel for many reasons, e.g., discomfort caused by the brightness level of the touch display panel, when the user is operating the touch display panel from a short distance, the touch display device may control the touch display panel to display images with the brightness level adjusted by the user. The touch display panel may display images with a desired brightness level for the user to watch the displayed images from far away.

Various methods may be used to determine if the user performs operations with or without adjusting the brightness level. The specific method to implement this function may be determined according to different applications and designs, and are not repeated herein.

The present disclosure has several advantages. For example, by detecting the user's operation on the touch display panel and detecting the distance between the user and the touch display panel, the touch display device may automatically reduce the brightness level of the touch display panel when the user is operating the touch display panel from a short distance so that the user may watch the displayed images with a desired brightness level. Further, the automatic brightness level adjustment may prevent the high brightness level of the touch display panel from harming the user's vision. In addition, the touch display device may control the touch display panel to display images with the brightness level before the touch motion or a brightness level adjusted by the user. Thus, the user may watch the display images with a safe and comfortable brightness level.

Another aspect of the present disclosure provides a touch display device.

As shown in FIG. 2, the touch display device may include a touch display panel 21, a touch motion detecting module 22, a distance detecting module 23, and a processing module 24. The processing module 24 may be electrically connected to or may be coupled to the touch display panel 21, the touch motion detecting module 22, and the distance detecting module 23.

The touch motion detecting module 22 may be configured to detect if a touch motion is performed on the touch display panel 21. Specifically, the touch motion detecting module 22 may include suitable components or devices capable of detecting a touch motion on the touch display panel 21. For example, the touch motion detecting module 22 may include pressure sensors. The touch motion detecting module 22 may detect a touch motion on the touch display panel 21 by sensing the pressure change on the touch display panel 21. The touch motion detecting module 22 may also include touch-sensing components in the touch-sensing circuits of the touch display panel 21. In this case, the touch motion detecting module 22 may detect a touch motion on the touch display panel 21 by sensing the changes of the touch-sensing signals. The touch motion detecting module 22 may include optical sensors, thermal sensors, etc., that can be used to detect user touch motions on the touch display panel 21. The touch-sensing components may be one or more of any suitable capacitive touch-sensing devices, resistive touch-sensing devices, and optical touch-sensing devices.

The distance detecting module 23 may be configured to determine the distance between the user and the touch display panel 21. Specifically, the distance detecting module 23 may include suitable components or devices capable of detecting the distance between the user and the touch display device. For example, the distance detecting module 23 may include one or more of suitable infrared sensors, acoustic sensors, and cameras. When the distance detecting module 23 include cameras, the touch display device may periodically obtain the user's images, and determine the distance between the user and the touch display panel 21 based on the comparison between the user's images to the preset images. When the distance detecting module 23 include infrared sensors, infrared light may be used to measure the distance between the user and the touch display panel 21. When the distance detecting module 23 includes acoustic sensors, acoustic waves may be used to measure the distance between the user and the touch display panel 21.

In some embodiments, the touch display device may determine the user has left the touch display panel 21 by combining the detection results of the touch motion detecting module 22 and the distance detecting module 23. The touch motion detecting module 22 may include a touch sensor. For example, when the touch motion detecting module 22 include pressor sensors, the processing module 24 may sense through the touch motion detecting module 22 that the pressure applied on the touch display panel 21 has returned to the value before the touch motion. Also, when the touch motion detecting module 23 include touch-sensing components, the processing module 24 may sense through the distance detecting module 23 that the capacitance or electric current have returned to the values before the touch motion or have stopped changing. That is, the processing module 24 may detect no touch motion is performed on the touch display panel 21. Meanwhile, the processing module 24 may determine based on data received from the distance detecting module 23 that no user is present within a certain distance range. For example, when the distance detecting module 23 includes at least one camera, the comparison between the periodically taken user's images with the preset image may indicate the user is not within the preset distance. Thus, the processing module 24 may determine that the user has left the touch display panel 21 and may respond accordingly. For example, the processing module 24 may automatically adjust the brightness level of the touch display panel 21 to the regular brightness level or a higher brightness level for the user to watch the displayed images from far away.

When the touch display panel 21 is displaying images with the regular brightness level and the processing module 24 detects a touch motion on the touch display panel 21, the processing module 24 may control the touch display panel 21 to display images with a preset brightness level. The touch display panel 21 may also obtain the detected distance between the user and the touch display panel 21 from the distance detecting module 23. When the touch display panel is displaying images with the preset brightness level and the distance between the user and the touch display panel 21 is longer than or equal to a preset distance, the processing module 24 may control the touch display panel 21 to display images with the regular brightness level, i.e., the brightness level before touch motion. If after touching the touch display panel 21, the user also adjusts the brightness level of the touch display panel 21, e.g., adjusting the regular brightness level of the touch display panel 21 to a higher or a lower brightness level, the processing module 24 may control the touch display panel 21 to display images with the brightness level chosen by the user.

It should be noted that, the preset distance may be a distance suitable for a user to watch displayed images with desired safety and comfort. In some embodiments, the preset distance may be set or adjusted by the user. For example, the preset distance may be 100 cm, 150 cm, or 200 cm. In another example, the preset distance may also be a distance in relation to the size of the display panel, such as 2 times or 3 times of the size of the display panel.

In some embodiments, the processing module 24 may be one or more of a central processing unit, a single-chip microcomputer, and a digital signal processing module.

In some embodiments, the touch display device may further include a storage module 25. The storage module 25 may be electrically connected to or may be coupled to the processing module 24 to implement suitable storing functions such as saving the preset brightness level and saving the brightness level of the touch display panel 21 before the touch motion. By arranging the storage module 25, the touch display panel 21 may display images with the preset brightness level each time the user touches the touch display panel 21. Multiple changes of brightness level due to more than one touch motions on the touch display panel 21 can be avoided. The touch display panel 21 may also display images with the brightness level before the touch motion when the user does not adjust or reset the brightness level. Thus, the user may watch the touch display panel with a desirably safe and comfortable brightness level.

By arranging the touch motion detecting module, the distance detecting module, and the processing module, the touch display device may be able to detect the touch motions on the display panel and the distance between the user and the touch display panel. The touch display device may also automatically reduce the brightness level when the user operates the touch display panel from a short distance such that the user may watch the displayed images with a safe and comfortable brightness level. Harm to the user's vision caused by undesirably high brightness level may be avoided or reduced. The touch display device may automatically adjust the brightness level of the touch display panel to the brightness level before the touch motion or a brightness level adjusted by the user, after the user leaves and is sufficiently far away from the touch display panel. The user may thus watch the displayed images with a desirably safe and comfortable brightness level.

FIG. 3 illustrates the specific components of an exemplary touch display device. As shown in FIG. 3, the touch display device may include a touch display panel 31, a first sensor 32, a second sensor 33, and a controller 34. The controller 34 may be arranged to be in the touch display device or outside the touch display device, depending on actual requirements and different applications. The controller 34 may be electrically connected to the touch display panel 31, the first sensor 32, and the second sensor 33.

The first sensor 32 may be configured to detect if a touch motion is performed on the touch display panel 31. The first sensor 32 may implement the functions of the touch motion detecting module 22 shown in FIG. 2. Specifically, the first sensor 32 may include suitable components or devices capable of detecting a touch motion on the touch display panel 31. For example, the first sensor 32 may include pressure sensors, optical sensors, thermal sensors, etc. The first sensor 32 may detect a touch motion on the touch display panel 31 by sensing the pressure change on the touch display panel 31. The first sensor 32 may also include touch-sensing components in the touch-sensing circuit of the touch display panel 31. In this case, the first sensor 32 may detect a touch motion on the touch display panel 31 by sensing the changes of the touch-sensing signals. The touch-sensing components may include one or more of any suitable capacitive touch-sensing devices/component, resistive touch-sensing devices/components, and optical touch-sensing devices/components.

The second sensor 33 may be configured to determine the distance between the user and the touch display panel 31. The second sensor 33 may implement the functions of the distance detecting module 23 shown in FIG. 2. Specifically, the second sensor 33 may include suitable components or devices capable of detecting the distance between the user and the touch display device. For example, the second sensor 33 may include one or more of suitable infrared sensors, acoustic sensors, and cameras. When the second sensor 33 include cameras, the touch display device may periodically obtain user images, and determine the distance between the user and the touch display panel 31 based on the comparison between the user images to the preset images. When the second sensor 33 include infrared sensors, infrared waves may be used to measure the distance between the user and the touch display panel 31. When the second sensor 33 include acoustic sensors, acoustic waves may be used to measure the distance between the user and the touch display panel 31.

In some embodiments, the touch display device may determine the user has left the touch display panel 31 by combining the detection results of the first sensor 32 and the second sensor 33. For example, when the first sensor 32 include pressor sensors, the controller 34 may sense through the first sensor 32 that the pressure applied on the touch display panel 31 has returned to the value before the touch motion or has stopped changing. Also, when the first sensor 33 include touch-sensing components, the controller 34 may sense through the second sensor 33 that the capacitance or electric current have returned to the values before the touch motion or have stopped changing. That is, the processing module 34 may detect no touch motion is performed on the touch display panel 31. Meanwhile, the controller 34 may sense from the second sensor 33 that no user is present within a certain distance range. For example, when the distance detecting module 33 includes at least one camera, the comparison between the periodically taken user's images with the preset image may indicate the user is not within the preset distance. Thus, the controller 34 may determine that the user has left the touch display panel 31 and may respond accordingly. For example, the controller 34 may automatically adjust the brightness level of the touch display panel 31 to the regular brightness level or a higher brightness level for the user to watch the displayed images from far away.

When the touch display panel 31 is displaying images with the regular brightness level and the controller 34 detects a touch motion on the touch display panel 31, the controller 34 may control the touch display panel 31 to display images with a preset brightness level. The touch display panel 31 may also obtain the detected distance between the user and the touch display panel 31 from the second sensor 33. When the touch display panel is displaying images with the preset brightness level and the distance between the user and the touch display panel 31 is larger than or equal to a preset distance, the controller 34 may control the touch display panel 31 to display images with the regular brightness level before touch motion. If after touching the touch display panel 31, the user also adjusts the brightness level of the touch display panel 31, e.g., adjusting the regular brightness level of the touch display panel 31 to a higher or a lower brightness level, the controller 34 may control the touch display panel 31 to display images with the brightness level adjusted by the user.

It should be noted that, the preset distance may be a distance suitable for a user to watch displayed images. In some embodiments, the preset distance may be set or adjusted by the user. For example, the preset distance may be 100 cm, 150 cm, or 200 cm. In another example, the preset distance may also be a distance in relation to the size of the display panel, such as 2 times or 3 times of the size of the display panel.

In some embodiments, the controller 34 may be one or more of a central processing unit, a single-chip microcomputer, and a digital signal processing module. The controller 34 may implement the functions of the processing module 24 shown in FIG. 2.

In some embodiments, the touch display device may further include a storage 35. The storage 35 may be electrically connected to the controller 34 to implement suitable storing functions such as saving the preset brightness level and saving the brightness level of the touch display panel 31 before the touch motion. By arranging the storage 35, the touch display panel 31 may display images with the preset brightness level each time the user touches the touch display panel 31. Multiple changes of brightness level due to more than one touch motions on the touch display panel 31 can be avoided. The touch display panel 31 may also display images with the brightness level before the touch motion when the user does not adjust or reset the brightness level. Thus, the user may watch the touch display panel with a desirably safe and comfortable brightness level.

By arranging the first sensor, the second sensor, and the controller, the touch display device may be able to detect the touch motions on the display panel and the distance between the user and the touch display panel. The touch display device may also automatically reduce the brightness level when the user operates the touch display panel from a short distance such that the user may watch displayed images with a safe and comfortable brightness level. Embodiments of the present disclosure may prevent the harm to the user's vision caused by undesirably high brightness level. The touch display device may automatically adjust the brightness level of the touch display panel to the brightness level before the touch motion or a brightness level adjusted by the user, after the user leaves and is sufficiently far away from the touch display panel.

The operating method to adjust the brightness level of the touch display device is further described in relation to the computer programs for executing the functions of brightness level adjustment. The touch display device for illustrating this example is the touch display device shown in FIG. 3. The touch display device may include a touch display panel 31, a first sensor 32, a second sensor 33, and a controller 34. FIG. 4 illustrates the process flow of an exemplary computer program to adjust the brightness level in the touch display device shown in FIG. 3. The operating method may include steps S401 to S404.

In step S401, after the start of the computer program, the first sensor 32 may detect if a touch motion is performed on the touch display panel 31. If the first sensor 32 does not detect any touch motion performed on the touch display panel 31, the computer program may proceed to the start of the computer program and repeat step S401.

For example, suitable sensors, e.g., pressure sensors, may be used to detect the pressure change on the touch display panel 31 to determine if the touch display panel 31 is touched.

Also, touch-sensing components in the touch-sensing circuit of the touch display panel 31 may be used to detect if the touch display panel 31 is touched. The touch display device may determine if the touch display panel is touched by detecting changes of the touch-sensing signals caused by the touch motion. Specifically, the touch-sensing components may include one or more of capacitive touch-sensing devices, resistive touch-sensing devices, and optical touch-sensing devices.

Other suitable devices capable of detecting touch motions on the touch display panel 31 may also be used according to different applications and designs and should not be limited by the embodiments of the present disclosure.

In step S402, if the first sensor 32 detects a touch motion performed on the touch display panel 31, the touch display device may control the touch display panel 31 to display images with a preset brightness level.

In some embodiments, to prevent the touch display panel 31 from changing the brightness level multiple times when the touch display panel 31 is touched more than once, the operating method may also include setting and saving the preset brightness level before the touch display device detects the touch motion such that the touch display panel 31 maintains the preset brightness level. Thus, the touch display panel 31 may display images with the preset brightness level each time the touch display device detects a touch motion.

Further, after the user leaves the touch display panel and is sufficiently far away from the touch display panel, to control the touch display panel 31 to display images 31 with the brightness level before the touch motion so that the user may watch the displayed images from a safe and comfortable distance, the operating method may also include saving the previous brightness level of the touch display panel 31 before controlling the touch display panel 31 to display images with the preset brightness level. The previous brightness level refers to the brightness level or regular brightness level of the touch display panel 31 before the user touches the touch display panel 31. By saving the previous brightness level, after the user leaves the touch display panel 31, the touch display device may control the touch display panel 31 to display images with the brightness level before the touch motion.

In step S403, further, the second sensor 33 may detect the distance between the user and the touch display panel 31.

For example, the second sensor 33 may include a camera to periodically obtain the user's image and comparing the obtained user's image to a preset image to determine the distance between the user and the touch display panel 31. The second sensor 33 may also include infrared sensors and/or acoustic sensors to determine the distance between the user and the touch display panel 31. Other suitable sensing devices may also be used to determine the distance between the user and the touch display panel. The specific types of sensing devices to implement this function should not be limited by the embodiments of the present disclosure.

In step S404, the controller 34 may determine the distance between the user and the touch display panel 31 from the second sensor 33 and determine if the distance is larger than or equal to a preset distance. The preset distance may be a distance value set in advance by the user. The preset distance may be a suitable distance value such as 100 cm, 150 cm, and 200 cm. If the controller 34 determines the distance between the user and the touch display panel 31 is greater than or equal to the preset distance, the computer program proceeds to step S405. If the controller 34 determines the distance between the user and the touch display panel 31 is less than the preset distance, the computer program may proceed to step S403.

For example, the preset distance can be 100 cm. If the detected distance between the user and the touch display panel 31 is 10 cm, 30 cm, or 60 cm, the detected distance is less than the preset distance. The controller 34 may determine that the user is not yet far away from the touch display panel 31 and is still within a distance not suitable for watching the displayed images with the regular brightness level. The controller 34 may control the touch display panel 31 to display images with the preset brightness level, i.e., a lower brightness level. If the detected distance between the user and the touch display panel 31 is 120 cm, greater than or equal to the preset distance, the controller 34 may determine the user already leaves the touch display panel 31 and is sufficiently far away from the touch display panel 31. The controller 34 may thus control the touch display panel 31 to display images with regular brightness level or a brightness level adjusted by the user.

In step S405, the controller 34 may control the touch display panel 31 to display images with the regular brightness level or a brightness level adjusted by the user.

If the user performs operations without adjusting the brightness level of the touch display panel 31, such as changing channels, adjusting volume, and typing, when the user is operating the touch display panel 31, the controller 34 may determine the user has left the touch display panel 31 and is sufficiently far away from the touch display panel 31. The controller 34 may control the touch display panel to display images with the brightness before the touch motion, e.g., the regular brightness level, so that the user may watch the touch display panel 31 from far away. If the user performs operations with adjusting the brightness level of the touch display panel 31, the controller 34 may control the touch display panel 31 to display images with the brightness level adjusted by the user, so that the touch display panel 31 may display images with a desired brightness level for the user to watch the displayed images from far away.

FIG. 5 illustrates a block diagram of the processing module 24 illustrated in FIG. 2 and the controller 34 illustrated in FIG. 3. For illustrative purposes, the processing module and the controller 34 may be referred to as the processing module/controller 500 in FIG. 5.

The processing module/controller 500 may receive, process, and execute commands from the touch display device. The processing module/controller 500 may include any appropriately configured computer system. As shown in FIG. 5, the processing module/controller 500 may include a processor 502, a random access memory (RAM) 504, a read-only memory (ROM) 506, a storage 508, a display 510, an input/output interface 512, a database 514; and a communication interface 516. Other components may be added and certain devices may be removed without departing from the principles of the disclosed embodiments.

Processor 502 may include any appropriate type of general purpose microprocessor, digital signal processor or microcontroller, and application specific integrated circuit (ASIC). Processor 502 may execute sequences of computer program instructions to perform various processes associated with the processing module/controller 500. Computer program instructions may be loaded into RAM 504 for execution by processor 502 from read-only memory 506, or from storage 508. Storage 508 may represent the storage module 25 illustrated in FIG. 2 and the storage 35 illustrated in FIG. 3. The storage 508 may include any appropriate type of mass storage provided to store any type of information that processor 502 may need to perform the processes. For example, storage 508 may include one or more hard disk devices, optical disk devices, flash disks, or other storage devices to provide storage space.

Display 510 may represent the touch display panels 21 and 31 illustrated in FIGS. 2 and 3, respectively. The display 510 may provide information to a user or users of the processing module/controller 500. Input/output interface 512 may be provided for users to input information into the processing module/controller 500 or for the users to receive information from the processing module/controller 500. For example, input/output interface 512 may include any appropriate input device, such as a keyboard, a mouse, an electronic tablet, voice communication devices, touch screens, or any other optical or wireless input devices. Further, input/output interface 512 may receive from and/or send to other external devices.

Further, database 514 may include any type of commercial or customized database, and may also include analysis tools for analyzing the information in the databases. Database 514 may be used for storing information for semiconductor manufacturing and other related information. Communication interface 516 may provide connection between the sensing components, e.g., touch motion detecting module and the distance detecting module, and the processing module/controller 500 so that the processor 502 may obtain information from the detecting modules. The communication interface 516 may also provide connection between the processing module/controller 500 and the outside environment so that the processing module/controller 500 may be accessed remotely and/or communicate with other systems through computer networks or other communication networks via various communication protocols, such as transmission control protocol/internet protocol (TCP/IP), hyper text transfer protocol (HTTP), etc.

In one embodiment, a user may input commands on the input/output interface 512 to operate the display 510. The user may use the commands to perform actions such as switching channels, changing volumes, and/or adjusting brightness levels. The processor 502 may receive, process, and execute the commands to obtain data from the communication interface 516. Data from the communication interface 516, e.g., data reflecting touch motions on the touch display panel, may be sent to the processor 502. Suitable data may be stored in ROM 506 and storage 508 to be processed. After the data is processed, the processor 502 may execute certain actions based on the processed data. For example, the processor 502 may control the touch display device to switch channels, adjust brightness levels, etc. The actions executed by the processor 502 may be returned to the user via the display 510 or the input/output interface 512.

In some embodiments of the present disclosure, there may be multiple users operating the touch display panel. The control of the brightness level may be customized by the user to accommodate various use scenarios. For example, the touch display panel may have a "conference room" setting, in which it would not change the brightness level of the display. The touch panel may have another "individual room" setting, in which the touch display panel may adjust the brightness level of the display as described in relation to FIGS. 2 and 3. The touch display panel may have an interface from which the user can select whether the touch display panel should be operating in the "conference room" setting or the "individual room" setting. In another example, under the "individual room" setting, the touch display panel may determine whether there are users located in a far-away range from the touch display panel. If the display panel detects multiple users watching the display from afar, for example, it may be set to not adjusting the brightness level of the screen even if one user is touching the screen in the close vicinity.

It should be noted that, the term "module" in the present disclosure may represent any device or parts with suitable hardware and software to implement a certain function. For example, a touch motion detecting module may refer to certain touch-sensing circuitry (e.g., sensors and related controls) to detect touch motions, and related control and communication circuitry to transmit signals reflecting the touch motions between the touch-sensing circuitry and the processing module. Certain software, e.g., programs, may be executed in the processing module to implement the touch-sensing functions. The specific choices of hardware and software in each module should be determined or adjusted according to different embodiments and are omitted herein. A distance detecting module may refer to camera and other position detection circuitry to detect a position of a user, and related control and communication circuitry to transmit signals reflecting the user position to the processing module. Certain software, e.g., computer programs, may be executed in the processing module to implement the position or distance sensing functions. The specific choices of hardware and software in each module should be determined or adjusted according to different embodiments and are omitted herein. Similarly, the storage module and the processing module includes the computer programs, processors, and communication circuitry to transmit signals so that the storage module and the processing module may implement the functions as described in relation to FIGS. 2 and 3.

In embodiments of the present disclosure, by detecting the touch motion and the distance between the user and the touch display panel, the touch display device may automatically reduce brightness level when the user is operating the touch display panel from a short distance. Thus, the user may watch the displayed images with a safer and more comfortable brightness level. This may avoid the harm to the user's vision caused by undesirably high brightness level, such as the brightness level of when the user is operating on the touch display panel from a short distance. The touch display panel may also display images with the brightness level before the touch motion or a brightness adjusted by the user when the user leaves and is sufficiently far away from the touch display panel. The user may watch the displayed images with a safer and more comfortable brightness level.

Another aspect of the present disclosure provides a semiconductor device. The semiconductor device may incorporate one or more of the above-mentioned touch display devices. In one embodiment, the semiconductor device may be a display apparatus. The display apparatus can be used in any products or parts with display functions such as a television, an electronic paper, a digital photo frame, a mobile phone and a tablet computer.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. An operating method for adjusting a brightness level of a touch display device with a touch display panel, comprising:

detecting a touch motion performed on the touch display panel; then adjusting the touch display panel to display images with a reduced first brightness level from a higher previous brightness level based on the touch motion detected; then detecting a distance between a user and the touch display panel to evaluate if the distance is greater than or equal to a preset distance; and then if the distance is evaluated to be greater than or equal to the preset distance, adjusting a brightness level of the touch display panel to display images with an increased second brightness level from the reduced first brightness level, wherein said increased second brightness level is the same as the higher previous brightness level, and if the distance is evaluated to be less than the preset distance, maintaining the brightness level at the reduced first brightness level and again detecting the distance between the user and the touch display to again evaluate if the distance is greater than or equal to the preset distance.

2. The operating method according to claim 1, wherein the detecting the touch motion performed on the touch display panel comprises: detecting a change of a pressure applied on the touch display panel.

3. The operating method according to claim 1, wherein the detecting the touch motion performed on the touch display panel comprises: detecting a change of touch-sensing signals transmitted by the touch display panel.

4. The operating method according to claim 1, wherein detecting the distance between the user and the touch display panel comprises: obtaining the user's images for comparing the user's images with a preset image to determine the distance between the user and the touch display panel.

5. The operating method according to claim 1, wherein detecting the distance between the user and the touch display panel comprises: measuring the distance between the user and the touch display panel by acoustic waves or infrared waves.

6. The operating method according to claim 1, further comprising displaying images with a preset brightness level if the user performs operations without adjusting the brightness level of the touch display panel.

7. The operating method according to claim 1, further comprising displaying images with a desired brightness level adjusted by the user.

8. An operating method for adjusting a brightness level of a touch display device with a touch display panel, comprising:
    detecting a touch motion performed on the touch display panel; then
    adjusting the touch display panel to display images with a reduced first brightness level from a higher previous brightness level based on the touch motion detected; then
    detecting a distance between a user and the touch display panel to evaluate if the distance is greater than or equal to a preset distance; and then
        if the distance is evaluated to be greater than or equal to the preset distance, adjusting a brightness level of the touch display panel to display images with an increased second brightness level from the reduced first brightness level, and
        if the distance is evaluated to be less than the preset distance, maintaining the brightness level at the reduced first brightness level and again detecting the distance between the user and the touch display to again evaluate if the distance is greater than or equal to the preset distance, and further comprising
    storing a value of the reduced first brightness level before detecting the touch motion performed on the touch display panel such that the touch display panel displays images with the reduced first brightness level when multiple touch motions are performed on the touch display panel.

9. An operating method for adjusting a brightness level of a touch display device with a touch display panel, comprising:
    detecting a touch motion performed on the touch display panel; then
    adjusting the touch display panel to display images with a reduced first brightness level from a higher previous brightness level based on the touch motion detected; then
    detecting a distance between a user and the touch display panel to evaluate if the distance is greater than or equal to a preset distance; and then
        if the distance is evaluated to be greater than or equal to the preset distance, adjusting a brightness level of the touch display panel to display images with an increased second brightness level from the reduced first brightness level, and
        if the distance is evaluated to be less than the preset distance, maintaining the brightness level at the reduced first brightness level and again detecting the distance between the user and the touch display to again evaluate if the distance is greater than or equal to the preset distance, and further comprising
    storing a value of the higher second brightness level, the higher second brightness level being a brightness level displayed by the touch display panel before the touch motion or after the brightness level is adjusted by the user.

10. A touch display device with a touch display panel, comprising:
    a touch motion detector for detecting a touch motion performed on the touch display panel;
    a distance detector for detecting a distance between a user and the touch display panel; and
    a processing module, coupled to the touch motion detector and the distance detector, wherein the processing module includes a processor configured to
        adjust the touch display panel to display images with a reduced first brightness level from a higher previous brightness level based on signals from the touch motion detector, and then
        determine if the distance is greater than or equal to a preset distance based on distance detected by the distance detector, and
            if the distance is greater than or equal to the preset distance, adjust a brightness level of the touch display panel to display images with a higher second brightness level from the reduced first brightness level, and
            if the distance is less than the preset distance, maintain the brightness level of the touch display panel at the reduced first brightness and then again determine if the distance is greater than or equal to the preset distance based on another distance detected by the distance detector;
    wherein the touch motion detector comprises a pressure sensor or a touch sensor and the distance detecting module comprises a camera, an infrared sensor or an acoustic sensor; and further comprising
    a storage module coupled to the processing module, wherein the storage module is configured to store the reduced first brightness level and the higher second brightness level of the touch display panel before the touch motion.

11. The touch display device according to claim 10, wherein the touch motion detector is configured to detect a touch motion by detecting a change of pressure applied on the touch display panel.

12. The touch display device according to claim 10, wherein the touch motion detector is configured to detect a touch motion by detecting a change of touch-sensing signals transmitted by the touch display panel.

13. The touch display device according to claim 10, wherein the processing module is configured to display images with a preset brightness level if the user performs operations without adjusting the brightness level of the touch display panel.

14. The touch display device according to claim 10, wherein the processing module is configured to display images with a desired brightness level adjusted by the user.

15. The touch display device according to claim 10, wherein the distance detector is configured to periodically obtain the user's images for comparing the user's images with a preset image to determine the distance between the user and the touch display panel.

16. A semiconductor device, comprising one or more of the touch display devices according to claim 10.

\* \* \* \* \*